(12) United States Patent  (10) Patent No.: US 9,151,408 B2
Larson et al.  (45) Date of Patent: Oct. 6, 2015

(54) METHOD OF POLISHING A METAL SURFACE OF A BARRIER DOOR OF A GATE VALVE USED IN A SEMICONDUCTOR CLUSTER TOOL ARCHITECTURE

(75) Inventors: Dean J. Larson, Pleasanton, CA (US); James A. Woodward, Milpitas, CA (US)

(73) Assignee: LAM RESEARCH CORPORATION, Fremont, CA (US)

( * ) Notice: Subject to any disclaimer, the term of this patent is extended or adjusted under 35 U.S.C. 154(b) by 666 days.

(21) Appl. No.: 13/482,278

(22) Filed: May 29, 2012

(65) Prior Publication Data

US 2013/0199705 A1  Aug. 8, 2013

Related U.S. Application Data

(60) Provisional application No. 61/595,719, filed on Feb. 7, 2012.

(51) Int. Cl.
*B32B 38/10* (2006.01)
*F16K 51/02* (2006.01)
*F16K 3/02* (2006.01)
*B24B 15/00* (2006.01)
*B24B 29/00* (2006.01)

(52) U.S. Cl.
CPC .............. *F16K 51/02* (2013.01); *B24B 15/00* (2013.01); *B24B 29/00* (2013.01); *F16K 3/0263* (2013.01)

(58) Field of Classification Search
CPC ....... B24B 15/00; B24B 29/00; F16K 3/0263; F16K 51/02
USPC ........ 156/281, 154; 451/48, 5, 11, 52, 51, 54, 451/120, 121, 231, 232; 251/193, 326
See application file for complete search history.

(56) References Cited

U.S. PATENT DOCUMENTS

| | | | | |
|---|---|---|---|---|
| 2,941,987 | A * | 6/1960 | Dewey | 525/378 |
| 6,079,693 | A * | 6/2000 | Ettinger et al. | 251/195 |
| 6,761,617 | B2 * | 7/2004 | Tozawa | 451/11 |
| 7,059,583 | B2 | 6/2006 | Tomasch | |
| 7,128,305 | B2 | 10/2006 | Tomasch | |
| 2006/0273277 | A1 * | 12/2006 | Heller et al. | 251/334 |
| 2008/0315141 | A1 * | 12/2008 | Thrash et al. | 251/170 |
| 2011/0236692 | A1 * | 9/2011 | Luo et al. | 428/421 |
| 2012/0103526 | A1 * | 5/2012 | Ouye et al. | 156/345.51 |

FOREIGN PATENT DOCUMENTS

EP  0 216 990  * 4/1987 ............... C08J 9/10

* cited by examiner

*Primary Examiner* — Jacob T Minskey
*Assistant Examiner* — Vishal I Patel (57) ABSTRACT

The method of preserving the anodized finish of a barrier door of a process module includes bonding a seal to a metal surface, anodizing the metal surface, and then using a CNC machine to polish the metal surface without damaging the seal. The metal surface is polished by traversing a polishing path along the metal surface with a polishing head maintaining frictional contact with the metal surface. The integrity of the seal is preserved by bounding the polishing head to skirt the edge of the seal by following the polishing path.

20 Claims, 7 Drawing Sheets

METHOD OF POLISHING A METAL SURFACE OF A BARRIER DOOR OF A GATE VALVE USED IN A SEMICONDUCTOR CLUSTER TOOL ARCHITECTURE

CROSS REFERENCE TO RELATED APPLICATIONS

This application claims priority under 35 U.S.C. §119(e) to U.S. Provisional Application Ser. No. 61/595,719 filed Feb. 7, 2012, entitled "METHOD OF POLISHING A METAL SURFACE OF A BARRIER DOOR OF A GATE VALVE USED IN A SEMICONDUCTOR CLUSTER TOOL ARCHITECTURE."

TECHNICAL FIELD

The present specification generally relates to methods of polishing metal surfaces, and more particularly to methods of polishing metal surfaces of barrier doors of gate valves used in semiconductor cluster tools.

BACKGROUND

In vacuum processing of thin film materials, such as in the manufacture of semiconductor devices, multiple processing modules are typically interfaced to permit transfer of wafers between the interfaced processing modules. The transfer of wafers between interfaced processing modules is typically accomplished with the help of transport modules, which typically move the wafers through slots or ports provided in the adjacent walls of the interfaced processing modules. Transport modules may be used in conjunction with a variety of processing modules, which may include, among others, semiconductor etching systems, material deposition systems, and flat panel display etching systems. The particular arrangement of transport modules and processing modules is frequently referred to as "cluster tool architecture."

In semiconductor process cluster tool architecture, the pressure within the transport module may be different than the pressure within an adjacent processing module. A gate drive valve may be used to isolate the various modules to: minimize leaks between a transport module that is at a different pressure than a processing module; minimize leaks between modules during pressure varying transitions; or to seal off a processing module from a transport module during processing.

In order to isolate a particular module, a gate valve may include a seal plate and a barrier door that seals off the particular module when engaged by the barrier door. The barrier door may include a vacuum seal that extends about the periphery of the door and a surface finished barrier seal face. The seal plate may include a barrier seal and a vacuum seal face. When the barrier door engages the seal plate in order to isolate the particular module, the vacuum seal of the barrier door may engage the mating vacuum seal face of the seal plate and the barrier seal of the seal plate may engage the mating barrier seal face of the barrier door. The seal plate sealing surfaces may be integrated into the chamber design, thus not requiring a separate seal plate, and the seal surfaces would be the chamber housing surfaces.

The barrier door may be fabricated from a metal, such as aluminum, by a process that involves anodizing the barrier door. Yet, such barrier doors can be prone to microcrack of the anodized surface thereby compromising the electrical and corrosive resistance of the anodized surface.

Accordingly, a need exists for additional methods of preserving the anodized metal surface of gate valve barrier doors.

SUMMARY

The method of preserving an anodized finish on a metal surface of a barrier door for a gate valve in a process module is described. According to one embodiment, the method can include bonding a seal to the metal surface, anodizing the metal surface, and then polishing the seal surface. The seal surface is polished by traversing a polishing path along the seal surface with a polishing head maintaining frictional contact with the seal surface. The seal integrity is maintained by bounding the polishing head to skirt the edge of the seal by following the polishing path. By following the polishing path, the polishing head can polish the seal surface immediately adjacent to the seal without touching or damaging the seal.

According to another embodiment, the anodized finished is preserved by applying the high temperatures needed to vulcanizing an elastomer seal to the metal surface of a barrier door before the anodize process. The metal surface is anodized after vulcanization and the seal surface is polished. The seal surface is polished by traversing a polishing path along the seal surface with a polishing head maintaining frictional contact with the seal surface. The seal integrity is maintained by bounding the polishing head to skirt the edge of the seal by following the polishing path and polishing the seal surface immediately adjacent to the seal without touching or damaging the seal.

These and additional features provided by the embodiments described herein will be made more fully understandable in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

In the present disclosure, the process of preserving an anodized metal surface involves curing the seal first, then anodizing the metal surface, and finally polishing the surface. Depending on the type of seal used, the curing process could require vulcanizing the vacuum seal to barrier door which requires high curing temperatures for an extended period of time (e.g., a pre-cure stage at temperatures of about 350° F. to about 370° F. for about five minutes and a final cure at temperatures about 400° F. for about 24 hours). The barrier door is then anodized. The final step of polishing can be accomplished via a computer numerical control (CNC) machine, polishing in an omni-directional direction, and using a polishing head. A method of polishing metal surfaces that require high temperature curing and anodized metal surfaces will be described in more detail herein.

Figure 1:
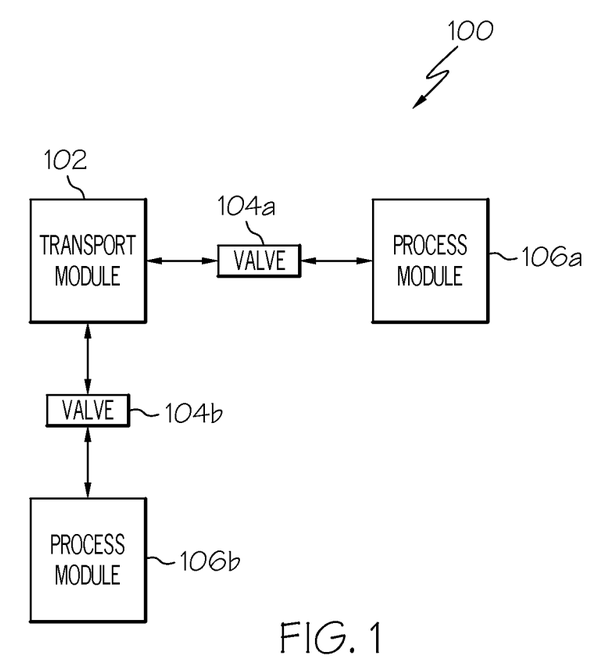
FIG. 1 schematically depicts a semiconductor process cluster tool architecture that includes a transport module, a plurality of processing modules, and a plurality of valves, according to one or more embodiments shown and described herein.

FIG. 1 schematically depicts a typical semiconductor process cluster tool architecture 100 that includes a transport module 102, a first processing module 106a, and a second processing module 106b. As depicted in FIG. 1, transport module 102 is coupled to the first processing module 106a through a first valve 104a, which is located between the transport module 102 and the first processing module 106a. Transport module 102 is also coupled to the second processing module 106b through a second valve 104b, which is located between the transport module 102 and the second processing module 106b.

In order to transfer a wafer from the first processing module 106a to the second processing module 106b, for example, a robotic arm within transport module 102 may reach into the first processing module 106a, pick up the wafer to be transported, and move the wafer through a slot or port in the adjacent wall of the first processing module 106a, through an opening in the valve 104a, through the interior of the transport module 102, through an opening in the second valve 104b, and finally through the adjacent wall of the second processing module 106b. While the semiconductor process cluster tool architecture 100 depicted in FIG. 1 includes two processing modules, 106a and 106b, the semiconductor process cluster tool architecture 100 may include more than or less than two processing modules.

The first valve 104a typically functions to isolate the first processing module 106a and the transport module 102 from one another in order to minimize leaks when it is desirable to isolate the modules, e.g., during pressure varying transitions, or to seal off the first processing module 106a from the transport module 102 during processing in the first processing module 106a. Similarly, the second valve 104b typically functions to isolate the second processing module 106b and the transport module 102 from one another in order to minimize leaks when it is desirable to isolate the modules, e.g., during pressure varying transitions, or to seal off the second processing module 106b from the transport module 102 during processing in the second processing module 106b.

Still referring to FIG. 1, each of the first processing module 106a and the second processing module 106b may be individually optimized to perform various processing steps. By way of example, but not by way of limitation, the first processing module 106a and the second processing module 106b may be configured to perform semiconductor etching, material deposition, flat panel display etching, and/or sputtering.

Figure 2:
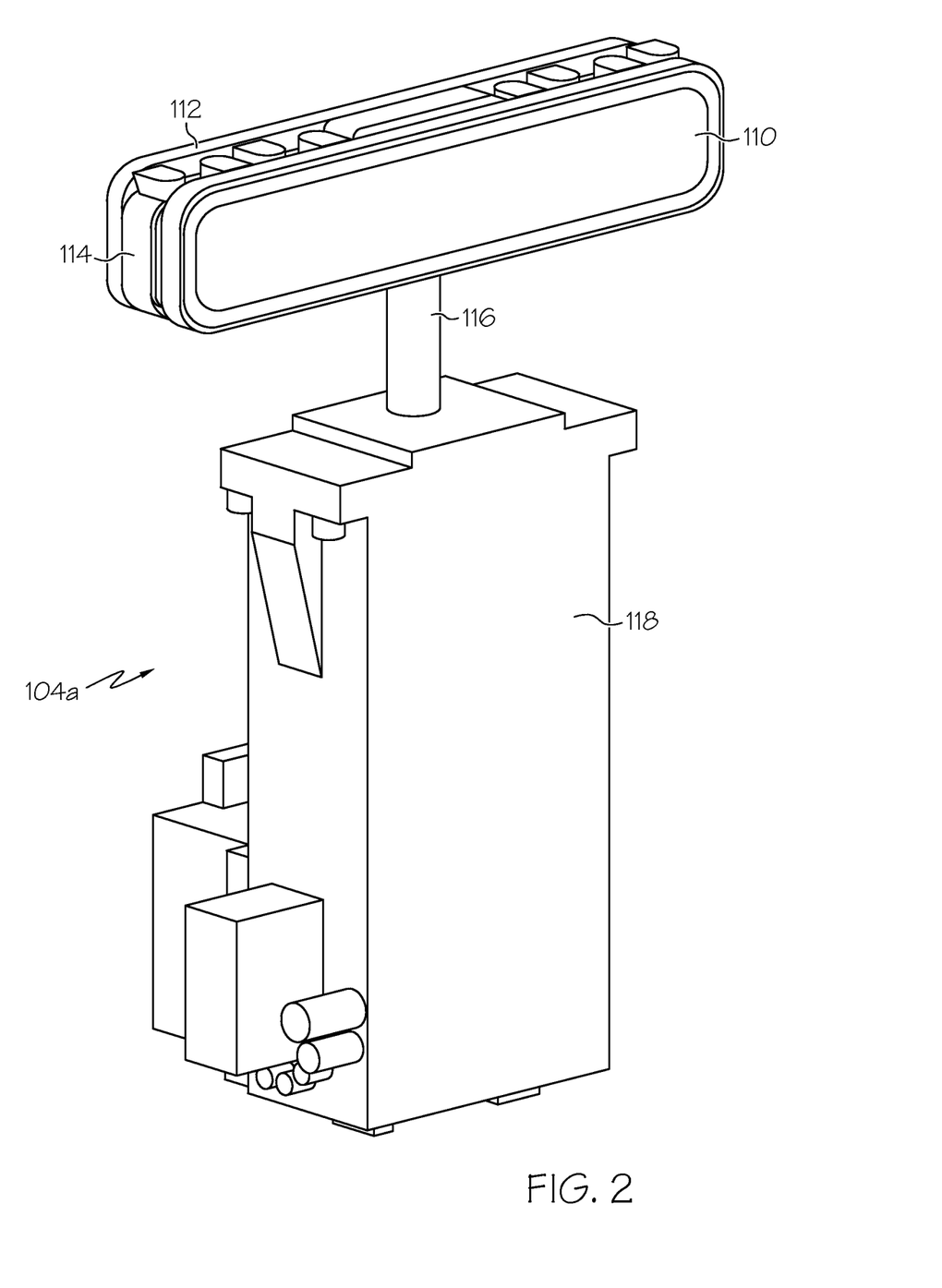
FIG. 2 depicts a perspective view of one of the valves shown in FIG. 1, according to one or more embodiments shown and described herein.

FIG. 2 depicts a perspective view of the first valve 104a as shown in FIG. 1. The first valve 104a includes an actuator-driven mechanism 118 that is operatively connected to a shaft 116 that extends from a top of the actuator-driven mechanism 118 in a direction substantially perpendicular to the top of the actuator-driven mechanism 118. The shaft 116 is mechanically coupled to a carrier 114. A process module barrier door 110 and a transport module door 112 are affixed to opposing sides of the carrier 114.

Figure 3:
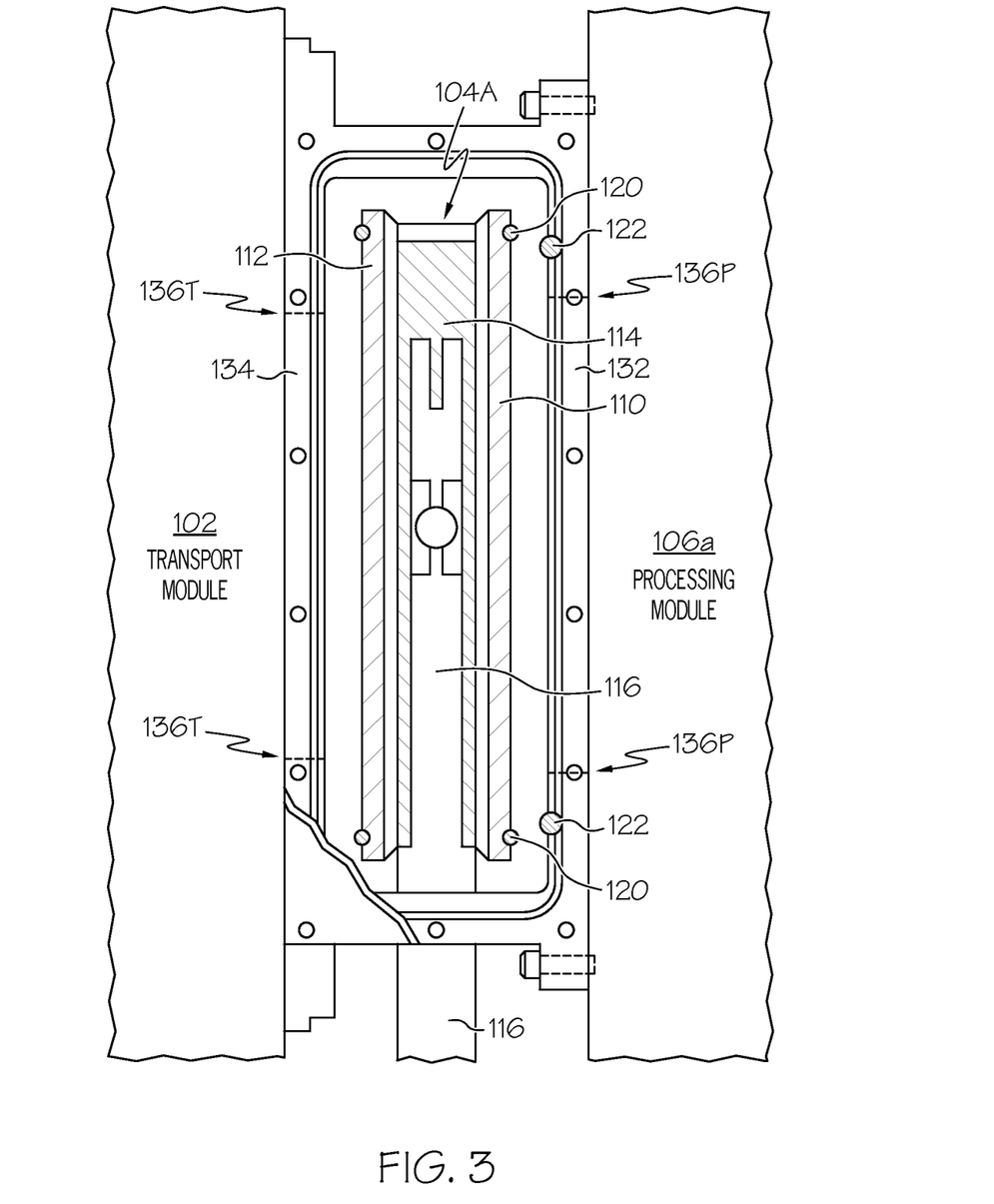
FIG. 3 depicts a plan view of the interface between a transport module, a processing module, and a valve located between the transport module and processing module, according to one or more embodiments shown and described herein.

FIG. 3 depicts a plan view of the interface between the transport module 102, the first processing module 106a, and the first valve 104a. The first valve 104a is positioned between the transport module 102 and the first processing module 106a of the semiconductor process cluster tool architecture 100.

The first valve 104a includes a transport module wall 134, a processing module wall 132, a processing module barrier door 110, a transport module door 112, a carrier 114, and a shaft 116, an opening 136P, and an opening 136T. The opening 136P is provided in the processing module wall 132 in order to permit wafers (not shown) to be transferred into and out of the first processing module 106a. Similarly, the opening 136T is provided in the transport module wall 134 in order to permit wafers (not shown) to be transferred into and out of the transport module 102. The opening 136P is generally rectangular in shape and is smaller in each dimension than the generally rectangular shape of the processing module barrier door 110, which is provided for sealing the opening 136P. The opening 136T is also generally rectangular in shape and is smaller in each dimension than the generally rectangular shape of the transport module door 112, which is provided for sealing the opening 136T.

In some embodiments, the corners of the processing module barrier door 110, the transport module door 112, the opening 136P, and the opening 136T are rounded, thus resulting in the "generally rectangular" shape referred to in the preceding paragraph. In other embodiments, the corners of the barrier doors and openings may not be rounded. In still other embodiments, the barrier doors and openings may be formed to have a shape other than rectangular.

Figure 4:
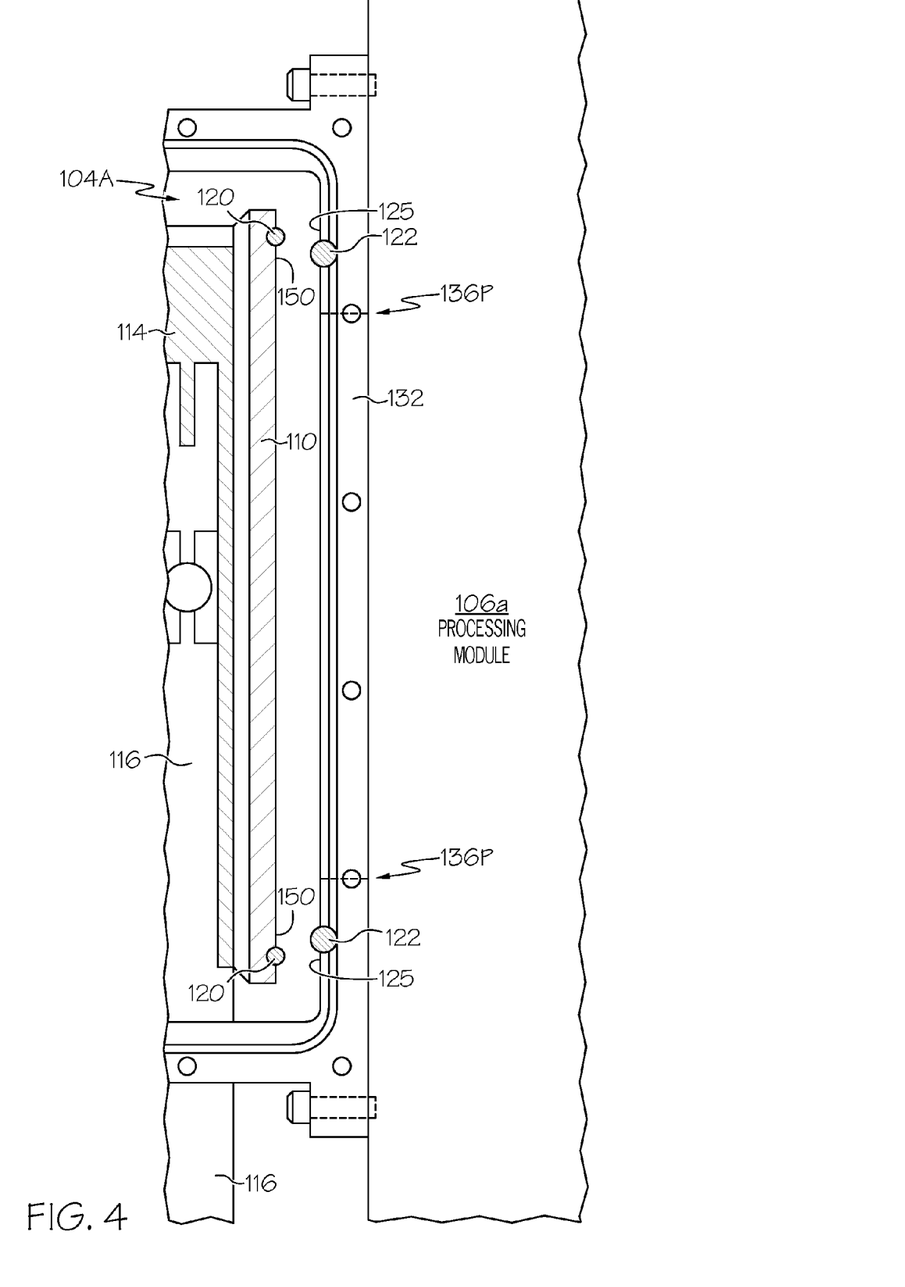
FIG. 4 depicts a plan view of the interface between a processing module and a process module barrier door according to one or more embodiments shown and described herein.

FIG. 4 depicts a plan view of the interface between a processing module 106a and a process module barrier door 110. The process module barrier door 110 has a barrier seal surface 150 and a vacuum seal 120. The process module wall 132 has a barrier seal 122 and a vacuum seal surface 125. The combination of the barrier seal 122 and the respective barrier seal surface 150 and the vacuum seal 120 and the respective vacuum seal surface 125 work to provide a vacuum-tight, or gas-tight, seal when the process module barrier door 110 is in a closed position, i.e. the barrier door 110 is pressed against the process module wall 132. Alternatively, a seal device may be vulcanized to the process module barrier door 110 or process module wall 132, or another type of seal device having a replaceable seal may be used.

Figure 5:
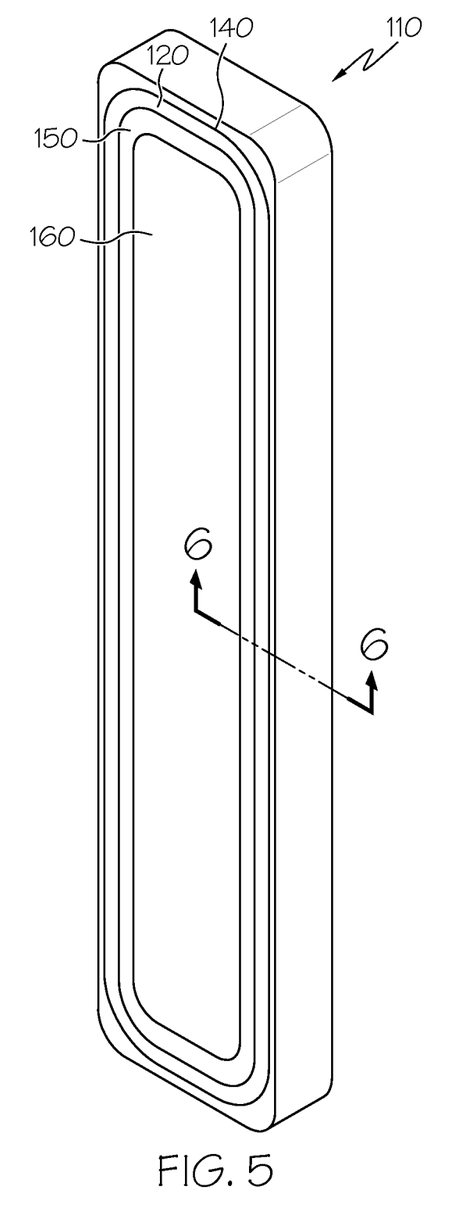
FIG. 5 depicts a perspective view of the processing module barrier door of the valve shown in FIG. 3, according to one or more embodiments shown and described herein.

FIG. 5 a perspective view of the processing module barrier door 110 of the first valve 104a shown in FIG. 3. The process module barrier door 110 encompasses a vacuum seal 120, a barrier seal surface 150, a groove 140 shaped to accept the vacuum seal 120, and the interior face 160. The entire face of the barrier door 110 to include the interior face 160, the barrier seal surface 150, and groove 140 are anodized surfaces. It should be understood that the groove 140 could also be unanodized. The cross section depicted in FIG. 6 is referenced by the 6-6 line on FIG. 5.

Figure 6:
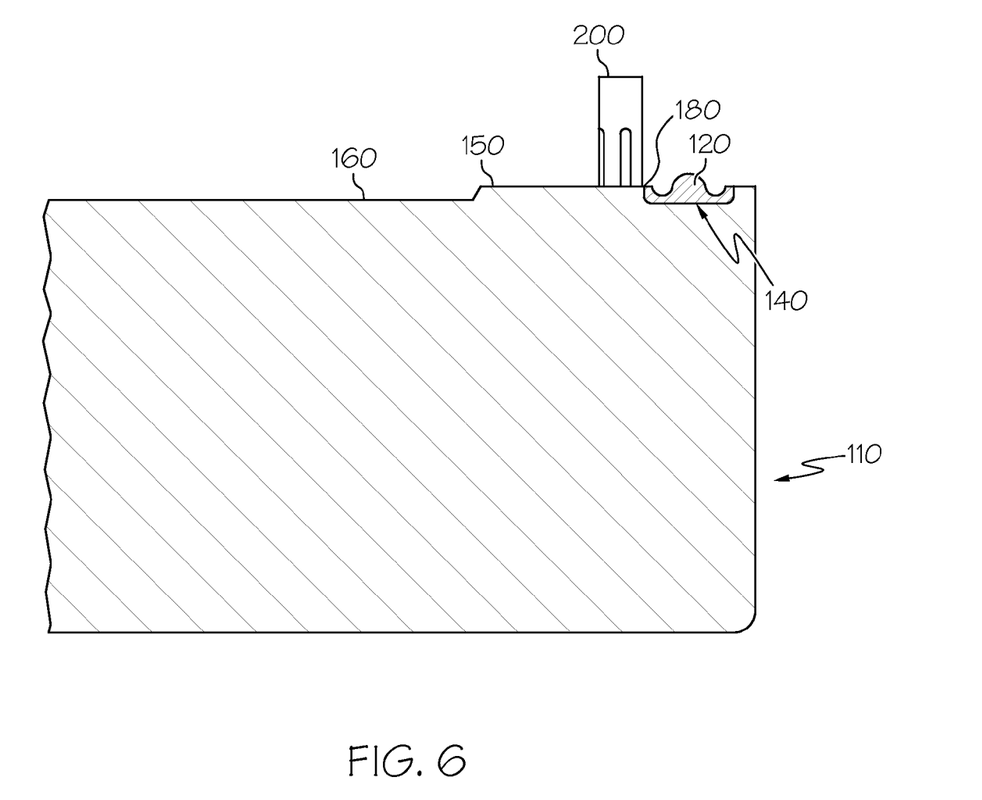
FIG. 6 depicts a partial cross-sectional view along the 6-6 line of the processing module barrier door depicted in FIG. 5, according to one or more embodiments shown and described herein.

FIG. 6 depicts a partial cross-sectional view along the 6-6 line of the processing module barrier door 110 depicted in FIG. 5. The process module barrier door 110 is shaped from aluminum to form an interior face 160, a barrier seal surface 150, and a groove 140 shaped to accept the vacuum seal 120. The vacuum seal 120 and process module barrier door 110 can be heated to about 350-370 degrees Fahrenheit for five minutes for pre-cure and 400 degrees Fahrenheit for 24 hours for final cure to vulcanize or bond the vacuum seal 120 to the groove 140. The process module barrier door 110 can then be treated to achieve a Type III hard anodized finish. A polishing head 200 is held by the CNC machine tool holder (not shown) and polishes the barrier seal surface 150 by skirting the edge 180 of the vacuum seal 120. Skirting the edge of the vacuum seal 120 means to polish the barrier seal surface 150 immediately adjacent to the edge 180 of the vacuum seal 120. Accordingly, in polishing the barrier seal surface 150 immediately adjacent to the edge 180, the polishing head 200 does not touch the edge 180 of the vacuum seal 120. It is believed that by avoiding contact with the vacuum seal 120, by bounding the motion of the polishing head 200, damage to the vacuum seal 120 can be avoided. The barrier seal surface 150 can be polished to a finish of less than or equal to about 8 Ra.

Figure 7A:
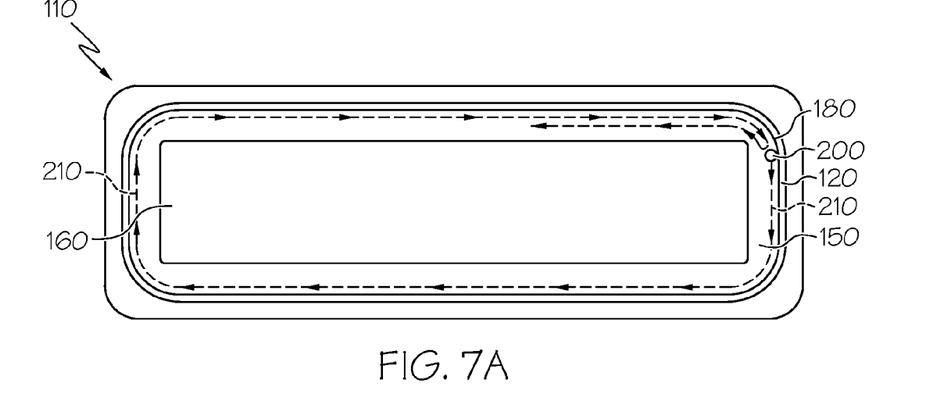
FIGS. 7a-c depicts several paths the polishing head can follow along a metal surface, according to one or more embodiments shown and described herein.
Figure 7B:
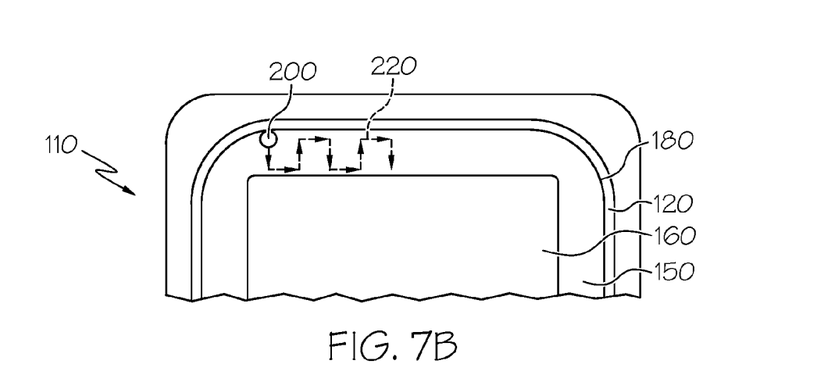
Figure 7C:
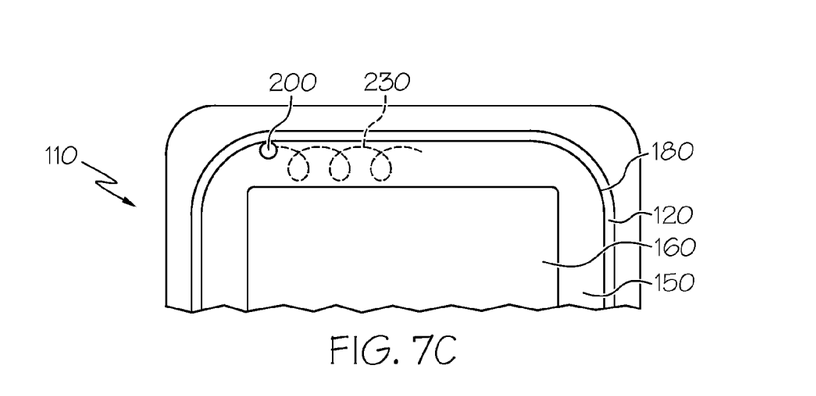

FIGS. 7a-c depict a top down view of the process module barrier door 110 along with the vacuum seal 120, barrier seal surface 150, and the interior face 160. In FIG. 7a, the polishing head 200 is depicted as moving along a parallel path 210 that is formed along the length of the edge 180 of the vacuum seal 120 on the process module barrier door 110. The polishing head 200 can traverse the parallel path 210 by incrementally offsetting enough to polish unpolished material. The polishing head 200 can continue to run in successive parallel motions similar to the parallel path 210 until all the unpolished barrier seal surface 150 adjacent to the vacuum seal 120 of the process module barrier door 110 is polished.

Referring now to FIG. 7b, the polishing head 200 can traverse a perpendicular path 220. The perpendicular path 220 can be defined such that at least a portion of the perpendicular path 220 is substantially perpendicular to the edge 180 of the vacuum seal 120 of the process module barrier door 110. The polishing head 200 can traverse the perpendicular path 220 in one or more iterations to enough to polish unpolished material. Accordingly, the polishing head 200 can continue to run in successive perpendicular motions until all the unpolished barrier seal surface 150 adjacent to the vacuum seal 120 of the process module barrier door 110 is polished.

Referring now to FIG. 7c, the polishing head 200 can move in an overlapping and substantially circular path 230 that covers the area of the barrier seal surface 150 adjacent to the vacuum seal 120 of the process module barrier door 110. The polishing head 200 can continue to run in overlapping and substantially circular paths 230 until all the unpolished barrier seal surface 150 adjacent to the vacuum seal 120 of the process module barrier door 110 is polished. It is noted that, while FIGS. 7a-c depict the parallel path 210, the perpendicular path 220, and the overlapping and substantially circular path 230 individually, the polishing head 200 can traverse a path that includes two or more of the perpendicular path 220, and the overlapping and substantially circular path 230.

The polishing head can be equipped with a backing pad and grit paper of various abrasiveness and material make-up; a buffing pad and an abrasive compound or abrasive slurry; a router bit; or any other tool or material that is designed to polish a surface. The polishing head can move the abrasive material in a circular motion, an orbital motion, or lock in place.

The polishing head engages the barrier door at the precise pressure required by the combination of the hardness of the metal composition of the barrier door and the type and abrasiveness of the grit to achieve the proper polish on the metal surface or anodize surface.

It should be appreciated that the precision of the CNC machine allows the polishing head to skirt the edge of the vacuum seal by tracing without touching or physically damaging the vacuum seal on the barrier door. A protective film or cover can be placed over the vacuum seal to protect the vacuum seal from the polishing head.

It should be appreciated that the vacuum seal could be a removable o-ring or a bonded seal through vulcanization. The vacuum seal could be made from rubber or fluoroelastomer or perfluoroelastomer or any other elastomer. Furthermore, the process module barrier door can be made of any type of metal to include aluminum, more specifically, type 6061-T6XX aluminum. The embodiments described herein are not limited to the process module barrier door or the processing module. The barrier seal could be made from a chemically inert material, more specifically, PFA. Since chemically inert plastics typically have low relative elastic properties, seals utilizing such materials typically have an inner elastic energizer, more specifically, an elastomeric material such as silicone or Viton, or a metallic spring energizer. When the application of the barrier seal is sensitive to metallic materials, the elastomeric energizer is preferred over the metallic spring energizer. A seal of this type is often referenced as a solidcore PFA encapsulated seal.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of polishing a metal sealing surface of a barrier door of a gate valve, the method comprising:
bonding a vacuum seal within a groove, wherein the groove is formed in the metal sealing surface of the barrier door, wherein the metal sealing surface seals to an exterior wall of the gate valve when closing off an opening in the wall, and wherein the opening provides access to an interior of a plasma chamber;
after the vacuum seal is bonded to the metal sealing surface, anodizing a first portion of the metal sealing surface without anodizing an interior face of the barrier door, wherein the interior face is separate from the metal sealing surface and is exposed to the interior of the plasma chamber when the barrier door is sealed to the wall of the gate valve, and wherein the metal sealing surface and the interior face are planar surfaces that extend parallel to each other;
subsequent to anodizing the first portion of the metal sealing surface, traversing a polishing path along the first portion of the metal sealing surface with a polishing head between (i) the interior face and (ii) an edge of the vacuum seal closest to the interior face, wherein the polishing head engages in frictional contact with the metal sealing surface; and while the polishing path is traversed, skirting an edge of the vacuum seal with the polishing head including polishing at least a second portion of the metal sealing surface abutting the edge without touching the vacuum seal.

2. The method of claim 1, wherein the metal sealing surface comprises aluminum.

3. The method of claim 1, wherein the metal sealing surface is a type III hard anodized coating that penetrates the metal sealing surface.

4. The method of claim 1, wherein the vacuum seal comprises an elastomer material.

5. The method of claim 4, wherein the vacuum seal comprises rubber.

6. The method of claim 4, wherein the vacuum seal is a fluoroelastomer seal.

7. The method of claim 4, wherein the vacuum seal is a perfluoroelastomer seal.

8. The method of claim 4, wherein the vacuum seal is vulcanized while the vacuum seal is bonded to the metal sealing surface.

9. The method of claim 8, wherein the vacuum seal is vulcanized at a temperature between 350° F. and 370° F.

10. The method of claim 8, further comprising, subsequent to the vulcanizing of the vacuum seal, post curing that vacuum seal at about 400° F.,
    wherein the vacuum seal is vulcanized at a temperature between 350° F. and 370° F.

11. The method of claim 1, wherein the vacuum seal is a removable o-ring.

12. The method of claim 1, wherein the metal sealing surface is polished to a surface finish of less than about 8 Ra.

13. The method of claim 1, wherein the polishing head is moved with a computer numerical control machine.

14. The method of claim 1, wherein the polishing path comprises a parallel path with respect to the edge of the vacuum seal.

15. The method of claim 1, wherein the groove has an unanodized surface and the vacuum seal is bonded to the unanodized surface of the groove.

16. A method of polishing a metal sealing surface of a barrier door of a gate valve, the method comprising:

vulcanizing an elastomer seal at a temperature between 350° F. and 370° F. such that the elastomer seal is bonded within a groove of the metal sealing surface, wherein the metal sealing surface seals to an exterior wall of the gate valve when closing off an opening in the wall, and wherein the opening provides access to an interior of a plasma chamber;

after the elastomer seal is bonded to the metal sealing surface, anodizing a first portion of the metal sealing surface without anodizing an interior face of the barrier door, wherein the interior face is separate from the metal sealing surface and is exposed to the interior of the plasma chamber when the barrier door is sealed to the wall of the gate valve, and wherein the metal sealing surface and the interior face are planar surfaces that extend parallel to each other;

subsequent to anodizing the first portion of the metal sealing surface, traversing a polishing path along the metal sealing surface with a polishing head between (i) the interior face and (ii) an edge of the elastomer seal closest to the interior face, wherein the polishing head engages in frictional contact with the metal sealing surface;

polishing at least a second portion of the metal sealing surface abutting the edge without touching the elastomer seal to a surface finish of less than 8 Ra, wherein the first portion includes the second portion; and while the polishing path is traversed, skirting the edge of the elastomer seal with the polishing head.

17. The method of claim 1, wherein the polishing path is a path that alternates between (i) extending in a direction parallel to the edge of the vacuum seal and (ii) extending in a direction perpendicular to the edge of the vacuum seal.

18. The method of claim 1, wherein, while following the polishing path with the polishing head, the polishing of the portion of the metal sealing surface is conducted in an alternating manner between parallel and perpendicular directions with respect to the edge of the vacuum seal.

19. The method of claim 1, wherein the polishing path is an overlapping and circular path that extends in a direction parallel to the edge of the vacuum seal.

20. The method of claim 1, wherein the interior face is recessed from the metal sealing surface.

* * * * *